United States Patent
Bastian

(10) Patent No.: US 11,628,707 B2
(45) Date of Patent: Apr. 18, 2023

(54) AIR VENT

(71) Applicant: fischer automotive systems GmbH & Co. KG, Horb a.N. (DE)

(72) Inventor: Ulf-Lothar Bastian, Pfalzgrafenweiler (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 381 days.

(21) Appl. No.: 17/000,828

(22) Filed: Aug. 24, 2020

(65) Prior Publication Data

US 2021/0061069 A1    Mar. 4, 2021

(30) Foreign Application Priority Data

Aug. 26, 2019   (DE) .................... 10 2019 122 815.8
Jun. 3, 2020    (DE) .................... 10 2020 114 687.6

(51) Int. Cl.
   *B60H 1/34* (2006.01)
   *B60H 1/00* (2006.01)

(52) U.S. Cl.
   CPC ....... *B60H 1/3414* (2013.01); *B60H 1/00564* (2013.01)

(58) Field of Classification Search
   CPC ... B60H 1/345; B60H 1/3414; B60H 1/00564
   USPC ....................................................... 454/155
   See application file for complete search history.

(56) References Cited

U.S. PATENT DOCUMENTS

| | | | |
|---|---|---|---|
| 10,195,924 B2 | 2/2019 | Doll | |
| 10,427,501 B2 | 10/2019 | Paris | |
| 2015/0174989 A1* | 6/2015 | Oe | F24F 13/14 454/152 |
| 2015/0273984 A1* | 10/2015 | Suzuki | B60K 35/00 454/152 |
| 2018/0056756 A1 | 3/2018 | Schall | |
| 2019/0193525 A1 | 6/2019 | Schmid | |

FOREIGN PATENT DOCUMENTS

| | | | |
|---|---|---|---|
| DE | 102 02 925 A1 | 7/2003 | |
| DE | 10 2013 210 053 B3 | 9/2014 | |
| DE | 10 2015 017 008 A1 | 7/2017 | |
| DE | 102017111011 A1 * | 7/2017 | ....... B60H 1/3414 |
| DE | 10 2016 116 358 A1 | 3/2018 | |
| DE | 10 2016 218 456 A1 | 3/2018 | |
| JP | 2014-58257 A | 4/2014 | |
| JP | 2014 234 117 A | 12/2014 | |

OTHER PUBLICATIONS

Search Report for corresponding German Application No. 10 2019 122 816.6, dated Mar. 27, 2020.

* cited by examiner

*Primary Examiner* — Allen R. B. Schult
(74) *Attorney, Agent, or Firm* — Renner, Otto, Boisselle & Sklar, LLP

(57) ABSTRACT

An air vent for ventilating a passenger compartment of a motor vehicle. So as to laterally deflect an air current through the air vent, the air vent includes two louvers including non-pivotable blades, which are oriented obliquely to a flow-through direction through the air vent and which can be moved obliquely to the flow-through direction into an air channel of the air vent.

8 Claims, 2 Drawing Sheets

AIR VENT

REFERENCE TO RELATED APPLICATIONS

This application claims priority under 35 USC § 119 to German Patent Application No. 10 2019 122 815.8, filed Aug. 26, 2019, and German Patent Application No. DE 10 2020 114 687.6, filed Jun. 3, 2020, the entire disclosures of which are incorporated herein by reference.

TECHNICAL FIELD OF THE INVENTION

The invention relates to an air vent.

Air vents are used to supply air to a passenger compartment of a motor vehicle. Air vents are typically disposed in a recessed manner in an instrument panel, a center console or trim parts of the passenger compartment, including an air outlet opening in a surface of the instrument panel, the center console or, the trim parts which faces the passenger compartment. Louvers including jointly pivotable blades that are disposed parallel next to one another for laterally or vertically deflecting an air current through the air vent are known. The unexamined patent application DE 10 2016 116 358 A1 discloses one example of such an air vent.

SUMMARY OF THE INVENTION

It is the object of the invention to provide an air vent including an option for deflecting an air current through the air vent without pivotable blades. Additional deflection options including pivotable blades are not precluded.

The air vent includes an air channel and an air guide element oriented obliquely to a flow-through direction through the air channel. The "flow-through direction" refers to the direction that an air current would follow locally, at the particular site, without deflection by the air guide element. "Obliquely to a flow-through direction" here denotes a direction that is not parallel to the flow-through direction, but forms an angle with the flow-through direction. The air vent according to the invention furthermore includes a moving device, and in particular a mechanism, by way of which the air guide element can be moved obliquely to the flow-through direction, and in particular transversely to the flow direction, into the air channel and out of the air channel. "Transversely to a flow-through direction" here denotes a direction that forms an angle between 45° and 135°, and in particular of 90°, with the flow-through direction. The moving device can, for example, be manually actuatable or drivable by an electric motor.

When the air guide element is located in the air channel, this deflects an air current through the air channel obliquely to one side, or vertically, as a result of the oblique orientation thereof, which is to say the air guide element changes a direction of the air current, which is referred to here as "flow direction," through the air channel in relation to the flow-through direction that the air current has when the air guide element is located outside the air channel. In particular, the air flows obliquely through the air channel, after passing the air guide element, at an acute angle with respect to a flow-through direction that the air current through the air channel of the air vent has without the air guide element. When the air guide element is moved out of the air channel, this does not change the flow direction. However, the air channel can change the flow-through direction of the air current independently of the air guide element, for example as a result of the shape thereof, and in particular the progression thereof, or potential other built-in components, flow obstructions or the like.

The air guide element is preferably rigid with the moving device or with a portion of the moving device. For example, the air guide element is integral with a component of the moving device. The air guide element is, in particular, a non-pivotable blade, as it is known from air vents, which is to say a strip-shaped or plate-shaped element, which can have a flow profile. "Non-pivotable" here refers to a possible adjustment movement for changing the angle with respect to the flow-through direction, but not to the movement for moving the air guide element obliquely to the flow-through direction into/out of the air channel, which may take place by a translatory and/or rotatory movement.

The air guide element is, in particular, disposed so close to an air outlet opening of the air channel as to guide a direction of an air current flowing out of the air channel when the air guide element is located in the air channel.

The invention has the advantage that no pivoting mechanism for the louver is required. The air guidance takes place by the louver being moved obliquely to the flow-through direction into the air channel, and out of the air channel.

The air vent according to the invention preferably includes multiple juxtaposed air guide elements, and in particular blades, which are oriented obliquely to the flow-through direction through the air channel. The blades form a louver. The blades are preferably, but not necessarily, parallel to one another. By way of the moving device, air guide elements, or the blades, can jointly be moved obliquely to the flow-through direction into the air channel, and out of the air channel. When the air guide elements, or blades, are located in the air channel, these deflect an air current through the air channel obliquely to the side or vertically. When the air guide elements, or blades, are located outside the air channel, these do not guide the air current through the air channel.

So as to be able to deflect the air current through the air channel in opposite directions, a preferred embodiment of the invention provides two air guide elements, which are oriented in opposite directions obliquely to the flow-through direction through the air channel, and which can be moved obliquely to the flow-through direction into the air channel, and out of the air channel, by way of the moving device, or multiple moving devices. "Opposite" means, in particular, a deflection to the left or right, or a deflection to the top or bottom. The blades can have the same angle, or different angles, oblique to the flow-through direction through the air channel, in one direction and in the opposite direction. Further air guide elements are possible.

The air vent can also include two louvers including blades oriented in opposite directions obliquely to the flow-through direction through the air channel, which can be moved obliquely to the flow-through direction into the air channel, and out of the air channel, by way of the moving device or devices. The blades can be moved into the air channel, and out of the air channel, independently of one another. Synchronization is also possible, which moves the blade, or blades, out of the air channel when moving the other blade, or blades, oriented in the opposite direction obliquely to the flow-through direction through the air channel into the air channel. The blade, or blades, oriented oppositely obliquely to the flow-through direction through the air channel is, or are, preferably not simultaneously located in the air channel. For a flow direction out of the air channel which is deflected in the flow-through direction, or, in any case, not through the blade/blades, the blades can preferably be moved simultaneously out of the air channel.

The air vent according to the invention preferably includes two moving devices for air guide elements, and in particular blades, that are oppositely oriented, obliquely to the flow-through direction through the air channel, by way of which the air guide elements, or the blades, can be moved obliquely to the flow-through direction into the air channel, and out of the air channel, wherein the air guide elements, or blades, oriented oppositely obliquely to the flow-through direction through the air channel are preferably not simultaneously located in the air channel. Instead of individual air guide elements, or blades, the air vent can, as described above, include louvers including juxtaposed air guide elements, or blades, that are oriented obliquely to the flow-through direction through the air channel and can be moved obliquely to the flow-through direction into the air channel, and out of the air channel, by way of the moving devices. The moving devices can be independent of one another or, for example, can have a shared drive.

One embodiment of the invention provides two air channels, which converge obliquely toward one another, toward an air outlet opening, so that air currents exiting the two air channels obliquely flow together and merge to form a joint exit air current. The air vent can include an air inlet channel that splits to form the two air channels. The two air channels can have separate air outlet openings or one shared air outlet opening, and they can merge in the flow-through direction in front of the air outlet opening. An outflow direction can be influenced by control of the air volumes that flow through the two air channels. If the air volume through one of the two air channels is greater, the air current exits obliquely in the direction in which this air channel extends obliquely toward the air outlet opening.

One refinement of the invention provides that one air guide element, or preferably two air guide elements, in each of the two air channels can be moved in and out, obliquely to the respective flow-through direction of the particular air channel. The air guide elements associated with an air channel are oriented oppositely obliquely to the flow-through direction through the air channel, so that, in each of the two air channels, the air flow can be deflected obliquely to the flow-through direction in the one direction, and preferably also in the opposite direction. The first air guide element can be moved obliquely to the flow-through direction into and out of the first air channel by way of the first moving device. If present, the second air guide element, which is oriented oppositely obliquely by way of the moving devices, can be moved obliquely to the flow-through direction into and out of the first air channel by way of the second moving device. A third, obliquely oriented air guide element can be moved by way of a third moving device and, if present, a fourth, oppositely obliquely oriented air guide element can be moved by way of a fourth moving device, likewise obliquely to the flow-through direction into and out of the second air channel. In this embodiment of the invention as well, louvers including obliquely oriented blades can be provided as air guide elements, instead of individual air guide elements. The moving devices can be completely separate mechanisms, but may also be implemented as one combined moving device.

One refinement provides that the air guide elements oriented in the same direction obliquely to the flow-through direction through the two air channels are synchronously moved obliquely to the flow-through direction into and out of the particular air channel by way of the moving devices. The air guide elements oriented in the opposite direction obliquely to the flow-through direction through the two air channels are likewise synchronously moved obliquely to the flow-through direction into and out of the particular air channel by way of the moving devices.

If the air vent includes two air channels, which converge obliquely toward one another, toward the air outlet opening, one embodiment provides a blocking element, by way of which at least one of the two air channels can be partially or completely blocked, so as to be able to restrict or shut off the air current through this air channel. In this way, it is possible to guide the exit air current out of the air vent in the direction in which the two air channels extend obliquely to the air outlet opening. One blocking element can be provided for each air channel. Preferably, however, the two air channels can alternately be partially or completely blocked by a single, shared blocking element. For example, the blocking element can be a displaceable damper slide, or blocking slide, or a pivotable damper.

One embodiment of the invention provides a cam control unit for driving the moving device or devices, so as to move the air guide element, or elements, into and out of the air channel or channels.

The features and feature combinations, designs and embodiments of the invention mentioned above in the description, and the features and feature combinations mentioned hereafter in the description of the figures and/or shown in a figure, can be used not only in the respective indicated or illustrated combinations, but also in other essentially arbitrary combinations, or alone. Embodiments of the invention that do not include all the features of a dependent claim are possible. It is also possible to replace individual features of a claim with other disclosed features or feature combinations.

BRIEF DESCRIPTION OF THE DRAWINGS

The invention will be described hereafter in greater detail based on one exemplary embodiment shown in the drawings. In the drawings.

DETAILED DESCRIPTION OF THE INVENTION

Figure 1:
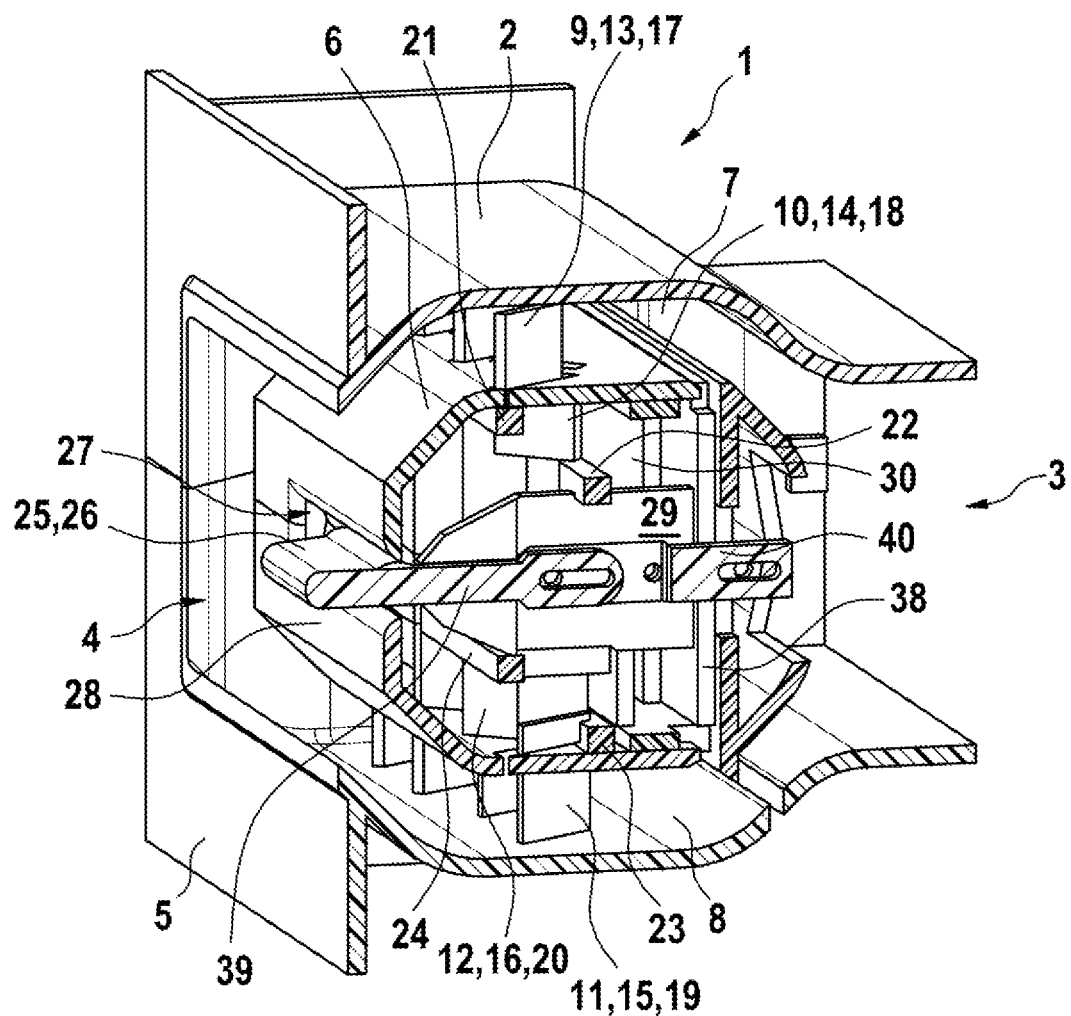
FIG. 1 shows a perspective longitudinal section of an air vent according to the invention.

The air vent 1 according to the invention shown in FIG. 1 is intended for supplying air into a passenger compartment of a motor vehicle, which is not shown. This includes an air channel 2 having an air inlet opening 3 and an air outlet opening 4. At the air outlet opening 4, the air vent 1 includes a plate-shaped panel 5. The air vent 1 is intended for a recessed installation in, for example, an instrument panel of the motor vehicle, wherein the panel 5 is flush with a surface of the instrument panel.

A hollow body is disposed in the air channel 2, serving as an air splitter 6, which in the exemplary embodiment has a flow profile, extends close to the air outlet opening 4 and splits the air channel 2 into a first air channel 7 and a second air channel 8, which can also be interpreted as partial air channels of the air channel 2.

In the exemplary embodiment, the air channel 2 has a rectangular tube cross-section, which widens in the region of the air splitter 6, and tapers again in the direction of the air outlet opening 4, so that the two air channels 7, 8 converge obliquely toward one another, toward the air outlet opening 4. The air splitter 6 extends transversely from a side wall to an opposite side wall through the air channel 2, so that the two air channels 7, 8 likewise have rectangular tube cross-sections. The described shape of the air channels 2, 7, 8 is not mandatory for the invention.

Four louvers 9, 10, 11, 12, including juxtaposed blades 13, 14, 15, 16, are disposed in the air splitter 6 designed as a hollow body, which, in general terms, can also be interpreted as air guide elements 17, 18, 19, 20. The blades 13, 14, 15, 16 forming the air guide elements 17, 18, 19, 20 are disposed on lands 21, 22, 23, 24 extending transversely to the air channel 2. The blades 13, 14, 15, 16 are rigidly disposed on the lands 21, 22, 23, 24, which is to say the blades 13, 14, 15, 16 are not pivotable. In the exemplary embodiment, the blades 13, 14, 15, 16 are integral with the lands 21, 22, 23, 24.

The blades 13, 14, 15, 16 forming the air guide elements 17, 18, 19, 20 are oriented obliquely to a flow-through direction through the air channel 2, or obliquely to a flow-through direction through the first and second air channels 7, 8, or obliquely to a longitudinal direction of the first and second air channels 7, 8, so that the blades 13, 14, 15, 16 guide an air current through the air channel 2, or through the first and second air channels 7, 8, obliquely to the side when these are located in the air channel 2, 7, 8.

Walls of the air splitter 6 delimiting the first and second air channels 7, 8 include slots for the blades 13, 14, 15, 16 to pass through. The lands 21, 22, 23, 24 at which the blades 13, 14, 15, 16 are disposed are displaceably guided, transversely to the longitudinal direction thereof, in the air splitter 6 in the direction in which the blades 13, 14, 15, 16 project therefrom, so that the blades 13, 14, 15, 16 can be moved obliquely to the flow-through direction into the first air channel 7 and the second air channel 8, and obliquely to the flow-through direction out of the air channels 7, 8. The movement takes place transversely here, substantially orthogonal to the flow-through direction. And more particularly, the first blades 13 and the second blades 14 can be moved into and out of the first air channel 7, and the third blades 15 and the fourth blades 16 can be moved into and out of the second air channel 8. The first blades 13 and the third blades 15 are obliquely oriented in a first direction, and the second blades 14 and the fourth blades 16 are obliquely oriented in an opposite direction, so that the first and third blades 13, 15 deflect the air current through the first and second air channels 7, 8 obliquely to one side, when these are located in the air channels 7, 8, and the second and fourth blades 14, 16 deflect the air current through the first air channel 7 and through the second air channel 8 obliquely to the opposite side, when these are located in the air channels 7, 8. The oppositely oblique first and second blades 13, 14, as well as the oppositely oblique third and fourth blades 15, 16, are not simultaneously located in the air channels 7, 8.

Figure 2:
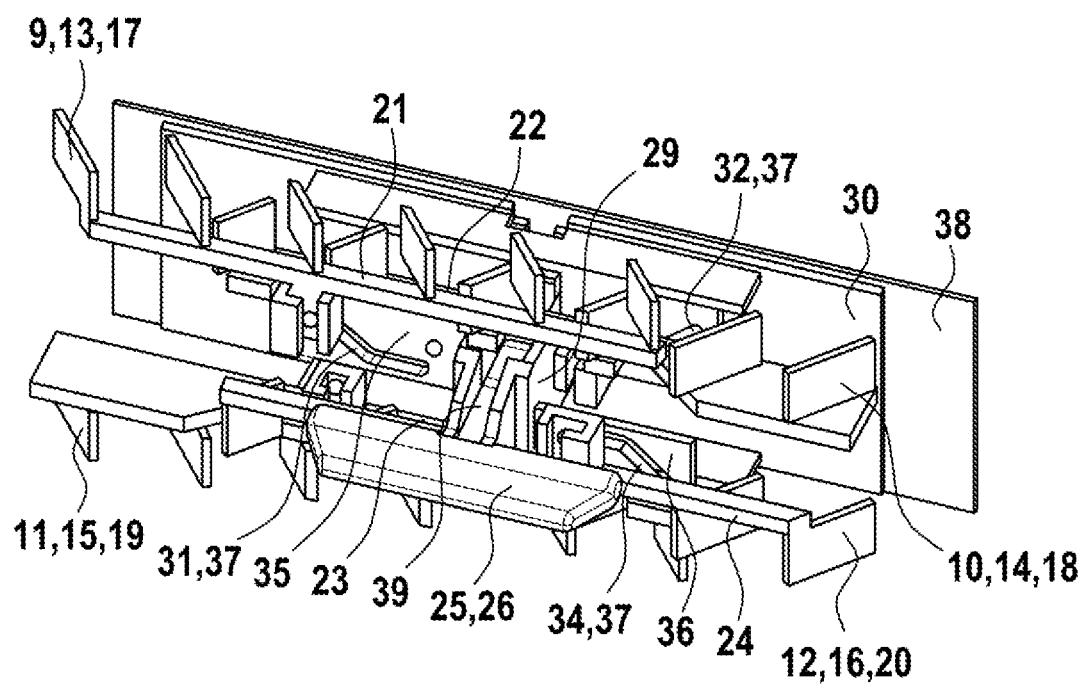
FIG. 2 shows louvers and moving devices of the air vent from FIG. 1 according to the invention in a perspective illustration with a different viewing direction than in FIG. 1.

So as to move the blades 13, 14, 15, 16 forming the air guide elements 17, 18, 19, 20, the air vent 1 includes a moving device 25, which is manual in the exemplary embodiment. The moving device 25 includes a handle 26, which protrudes through an opening 27 in an end wall 28 of the air splitter 6 which faces the air outlet opening 4, and which can be gripped in the air outlet opening 4. The handle 26 is pivotably mounted at two plate-shaped mounts 29, which project from a radial cam 30 that is rectangular in the exemplary embodiment. The radial cam 30, which is visible in FIG. 2, is displaceably guided in the air splitter 6, transversely to the air channel 2, close to an incident flow side of the air splitter 6 which faces the air outlet opening 3, and can be displaced by way of the handle 26.

The plate cam 30 includes two slots, serving as a second radial cam and a third radial cam 32 (the second radial cam is not visible in the drawing). Control tenons, which are not visible in the drawing, and project from the lands 22, 23 of the second and fourth louvers 10, 11, engage in the radial cams 32. The radial cams 32 include a straight section and an oblique section, wherein the oblique sections of the radial cams 32 move the louvers 10, 11 so that the second and third blades 14, 15 are moved into and out of the first and second air channels 7, 8 when the plate cam 30 is displaced by way of the handle 26, and the control tenons are located in the oblique sections of the radial cams 32. When the control tenons of the louvers 10, 11 are located in the straight sections of the radial cams 32, the second and third louvers 10, 11 do not move, and the second and third blades 14, 15 are located in the air splitter 6 outside the air channels 7, 8. "Straight sections" refers to sections of the radial cams 32 that extend in the displacement direction of the plate cam 30. When the second and third blades 14, 15 are located in the air channels 7, 8, these deflect the air flow through the air channels 7, 8 obliquely to one side, so that the air flows obliquely out of the air outlet opening 4 of the air vent in the one direction.

Two control plates 35, 36 protrude from the mounts 29 of the plate cam 30 in opposite directions, which include a first and a fourth radial cam 31, 34, likewise including a straight section and an oblique section. Control tenons, which are likewise not visible in the drawing and project from the lands 21, 24 of the first and fourth louvers 9, 12, engage in the first and fourth radial cams 31, 34. The oblique sections of the radial cams 31, 34 move the first and fourth louver 9, 12, so that the first and fourth blades 13, 16 are moved transversely to the flow-through direction into and out of the first and second air channels 7, 8 when the control tenons are located in the oblique sections of the first and fourth radial cams 31, 34, and the plate cam 30 is displaced by way of the handle 26. When the control tenons are located in the straight sections of the first and fourth radial cams 31, 34, the first and fourth louvers 9, 12 do not move, and the first and fourth blades 13, 16 are located in the air splitter 6 outside the air channels 7, 8. When the first and third blades 13, 15 are located in the air channels 7, 8, these deflect the air current through the air channels 7, 8 obliquely in the direction opposite that of the second and third blades 14, 15, so that the air flows obliquely out of the air vent 1 through the air outlet opening 3 in the direction opposite the one before.

The radial cams 31, 32, 33, 34 are disposed and shaped so as to jointly move the first and third blades 9, 11, which are obliquely oriented in the one direction, into and out of the first and second air channels 7, 8 and, at the same time, hold the second and fourth blades 14, 16, which are oppositely obliquely oriented, in the air splitter 6 outside the air channels 7, 8, and vice versa. The plate cam 30 and the control plates 35, 36 including the radial cams 31, 32, 33, 34, in which the control tenons of the louvers 9, 10, 11, 12, which are not visible in the drawing, engage, form a cam control unit 37 for moving the louvers 9, 10, 11, 12 and the blades 13, 14, 15, 16 that form the air guide elements 17, 18, 19, 20 transversely to the flow-through direction into and out of the two air channels 7, 8.

The moving device 25 can also be interpreted as multiple moving devices, for example as four moving devices for moving the four louvers 9, 10, 11, 12 by way of the handle 26, serving as a shared drive, in the exemplary embodiment.

For example, it is also conceivable that the first and third louvers 9, 11 are driven jointly, independently of the second and fourth louvers 10, 12, which can likewise be driven jointly (not shown). For example, it is also conceivable that the driving device is, or the driving devices are, driven by an electric motor (not shown).

A plate-shaped blocking element 38 is disposed on a side of the plate cam 30 facing the air inlet opening 3, which is displaceably guided in the air splitter 6 so as to be selectively displaceable through the slots of the air splitter 6 into one of the two air channels 7, 8. The one or the other air channel 7, 8 can be selectively partially or completely blocked by way of the blocking element 38. In this way, an air current through the particular air channel 7, 8 is restricted or suppressed. Since the two air channels 7, 8 converge obliquely toward one another, toward the air outlet opening 4, a ratio of the air volumes flowing through the two air channels 7, 8 determines an outflow direction. If one of the two air channels 7, 8 is partially or completely blocked, the air flows obliquely out of the air outlet opening 4 through the air vent 1 in the direction in which the free channel 7, 8, through which the larger air volume flows, extends obliquely toward the air outlet opening 4. Designs for the air vent 1 including one blocking element for each air channel 7, 8 (not shown) are also conceivable. The blocking element or elements can also be pivotable dampers, for example (not shown).

So as to displace the blocking element 38, a first lever 39, which is connected to a pivoting lever 40 in an articulated manner, protrudes from the handle 26 between the mounts 29, the pivoting lever likewise being located between the mounts 29 and being pivotably mounted at the mounts 29. The pivoting lever 40 engages on the blocking element 38 in an articulated manner. Pivoting of the handle 26, from which the first lever 39 rigidly projects, causes the pivoting lever 40 to be pivoted, which, in turn, moves the blocking element 38 into the first or second air channel 7, 8, depending on the movement direction.

The invention claimed is:

1. An air vent, comprising an air channel and an air guide element comprising a louver having non-pivotable blades that are laterally spaced apart from each other, the blades being oriented obliquely to a flow-through direction through the air channel, wherein the air vent comprises a moving device by way of which (i) blades can be jointly moved into the air channel such that air flows between the laterally spaced apart blades and is directed laterally, and (ii) the blades can be jointly moved out of the air channel.

2. The air vent according to claim 1,
wherein the air guide element is a first air guide element and the non-pivotable blades are first non-pivotable blades of the first air guide element,
wherein the air vent comprises a second air guide element comprising a second louver having second non-pivotable blades that are laterally spaced apart from each other,
wherein the first non-pivotable blades and the second non-pivotable blades are oppositely obliquely oriented to the flow-through direction through the air channel, and
wherein the moving device is a first moving device, the air vent comprising a second moving device by way of which (i) the second non-pivotable blades can be jointly moved into the air channel such that air flows between the laterally spaced apart second non-pivotable blades and is directed laterally, and (ii) the second non-pivotable blades can be jointly moved out of the air channel.

3. The air vent according to claim 2, wherein the first non-pivotable blades of the first air guide element, can be moved into the air channel, by way of the first moving device and, at a same time, the second non-pivotable blades of the second air guide element can be moved out of the air channel, by way of the second moving device.

4. The air vent according to claim 1,
wherein the air guide element is a first air guide element, the non-pivotable blades are first non-pivotable blades of the first air guide element, the moving device is a first moving device, and the air channel is a first air channel,
wherein the air vent further includes a second air channel, the first air channel and the second air channel converging obliquely toward one another, toward an air outlet opening, so that air currents exiting the first and second air channels flow together obliquely,
the air vent further comprises a third air guide element comprising a third louver having third non-pivotable blades that are laterally spaced apart from each other, wherein the third non-pivotable blades are oriented obliquely to the flow-through direction through the second air channel; and
wherein the air vent comprises a third moving device by way of which (i) the third non-pivotable blades can be jointly moved into the second air channel such that air flows between the laterally spaced apart third non-pivotable blades and is directed laterally, and (ii) the third non-pivotable blades can be jointly moved out of the second air channel.

5. The air vent according to claim 4, wherein the first non-pivotable blades of the first air guide element can be moved into the first air channel by way of the first moving device and, at a same time, the third non-pivotable blades of the third air guide element, can be moved into the second air channel by way of the third moving device, and/or the first non-pivotable blades of the first air guide element can be moved out of the first air channel by way of the first moving device and, at the same time, the third non-pivotable blades of the third air guide element can be moved out of the second air channel by way of the third moving device.

6. The air vent according to claim 4, wherein the air vent comprises a first blocking element, by way of which the first air channel can be partially or completely blocked, and a second blocking element, by way of which the second air channel can be partially or completely blocked.

7. The air vent according to claim 4, wherein the air vent comprises a blocking element, by way of which the first air channel or the second air channel can be selectively partially or completely blocked.

8. The air vent according to claim 1, wherein the moving device comprises a cam control unit for moving the non-pivotable blades of the air guide element into the air channel and/or out of the air channel.

* * * * *